May 24, 1960     M. C. GREEN     2,937,662

MULTIPLE INSULATED PIPE SYSTEM

Filed June 25, 1956

INVENTOR.
Marion C. Green
BY
ATTORNEY.

United States Patent Office 2,937,662
Patented May 24, 1960

2,937,662

MULTIPLE INSULATED PIPE SYSTEM

Marion C. Green, 3921 E. 2nd, Wichita, Kans.

Filed June 25, 1956, Ser. No. 593,699

1 Claim. (Cl. 138—25)

This invention relates to multiple insulated pipe systems in the nature of an assembly of insulated units and which include fitting such as L's, T's, Y's, and other means for joining together straight lengths or sections of pipe to present a continuous passage through the assembly. All of the component parts of the assembly are insulated in a manner to maintain the temperature of the fluid passing through the assembly at predetermined levels and it is the primary object of this invention to provide such a system or assembly that is capable of inexpensive manufacture, ease of manipulation when bringing the parts together being another novel feature and which is particularly advantageous in that it holds the temperature of the fluid passing through the system when the assembly is in use.

It has heretofore been the custom to erect fluid conducting pipe assemblies by first bringing together the conduits or pipes that are used to accommodate the fluid or liquid and thereafter insulate the pipe sections and fittings with suitable material capable of preventing objectionable heat exchange. This invention contemplates the prefabrication of pipe systems or assemblies and the provision in the component parts thereof, of means for interconnecting the fittings and sections on the job without the use of special tools, equipment or metal handling devices, for it is contemplated that the parts of the entire assembly be made of plastic fiber or other similar material that is easily manipulated and cut through the use of a hand saw or other hand tool.

One of the important aims of the instant invention is the provision of a multi-part insulated fluid conducting assembly having a core formed continuously through the sections and fittings thereof, which core may be a conventional section of pipe or a continuous pipe created as a part of the assembly and through which the fluid or liquid being accommodated may pass.

A still further aim of this invention is to provide a fluid conducting assembly or system of the aforementioned character that has unique formations at the zones of juncture between the pipe sections and the fittings of the assembly so that the said sections and fittings may be moved together and retained in fixed relation without the use of fixtures or other mechanical devices.

Other objects of the invention include the manner in which the fittings are formed and insulated; the structure which is employed to establish an insulated section in a straight length of pipe; the unique way of creating and providing means for dividing an inner chamber of a pipe section into compartments to receive insulating material and structure capable of allowing relative longitudinal displacement of an inner and an outer case or conduit so that the insulating material forming a part of the entire assembly may be easily applied. Further objects of the invention will appear during the course of the following specifications referring to the accompanying drawing wherein:

Figure 1:
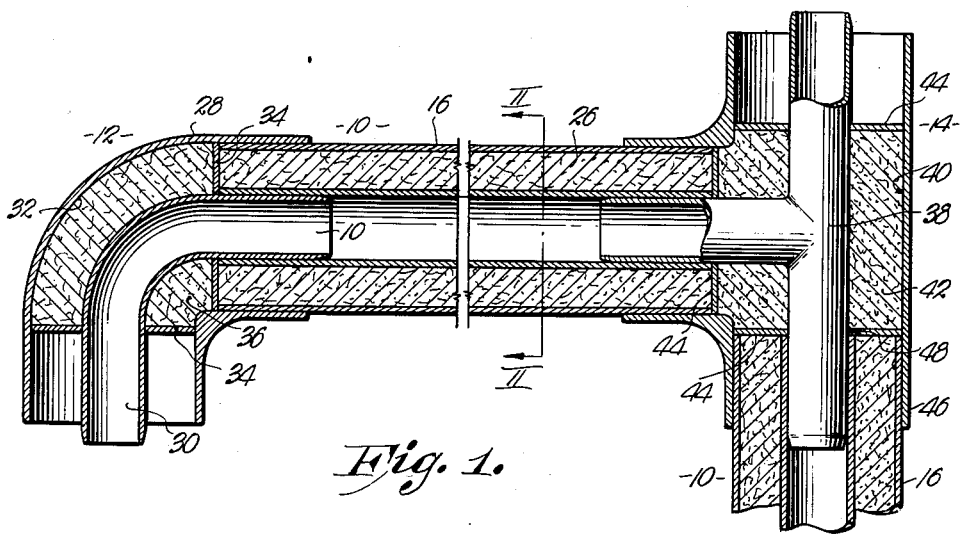
Figure 1 is a condensed central sectional view through a multi-part insulated fluid conducting assembly made in accordance with the present invention.
Figure 2:
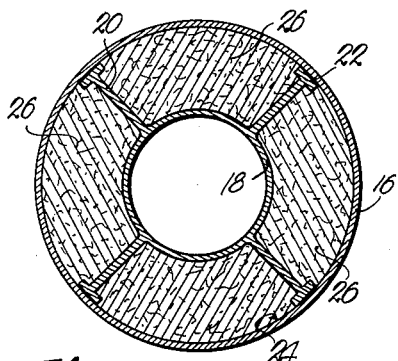
Fig. 2 is a cross sectional view taken on line II—II of Fig. 1 and looking in the direction of the arrow.
Figure 3:
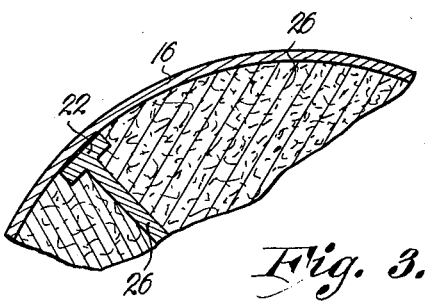
Fig. 3 is an enlarged detailed fragmentary, sectional view through the zone of juncture between a portion of the casing of a section and a partition forming a part of the structure.

In the accompanying drawing the preferred form of the invention is illustrated in Figs. 1, 2 and 3 and like reference numerals refer to similar parts throughout these views. Numeral 10 broadly designates a section of the assembly which is usually a long straight length of fluid conducting conduit or tubing composed of a number of parts to be hereinafter more specifically defined. The numeral 12 broadly designates a fitting in the form of an L, which cooperates with the aforesaid section 10 when the assembly requires such a fitting and another fitting, broadly designated by the numeral 14 is in the nature of a T which also may be directly connected to section 10 in order that the assembly or system which is being constructed may be completed.

Section 10 consists of a casing 16 circular in cross sectional form and character and relatively thin so far as the wall dimensions are concerned. This casing is preferably formed from plastic or similar material that may be extruded, rolled or otherwise formed and which is thin and non-corrosive. Within each relatively long section of a casing 16 is disposed a central pipe 18, likewise formed of plastic or similar non-corrosive material that will withstand not only drastic changes in temperature but any attack that acids or other substances may have thereon when the assembly is in commercial use. Pipe 18 is equipped with a number of radial partitions 20 integral with pipe 18 and formed as a part thereof when pipe 18 is manufactured through an extrusion process or other means that may be most economically employed. Each partition 20 has a relatively narrow wall 22 integral with the outer edge or portion thereof and, as illustrated in Fig. 3, this wall establishes an effective frictional grip upon the inner surface of casing 16. When the inner unit consisting of pipe 18 and partitions 20 is slipped into position within casing 16 the space between casing 16 and pipe 18 is divided into a number of chambers 24, each of which has a filling of insulating material 26, therein. This insulating material may be of sheet form and of any commercial type, but it is conceivable and well within the concepts of this invention that the insulating material 26 may be granular, fibrous or any other type so long as it fills chambers 24 and serves to prevent heat exchange between the material flowing through pipe 18 and the atmosphere around section 10.

Fitting 12 is of conventional outer form but the casing 28 thereof is composed of the same type of material from which casing 16 is molded or extruded. In other words, the material from which fitting 12 is made should be non-corrosive and acid resistant for in many instances the entire pipe assembly is either buried in the earth or mounted in a working position where the corrosive effects would be destructive to a pipe system made of metal. A conduit 30 disposed within fitting 12 is formed of like material and the diameter of conduit 30 is much smaller than the inside diameter of fitting 12. Thus a space 32 is formed between conduit 30 and casing 28 and before partitions 34 are moved into place a filling of insulating material 36 is packed into the space 32. Partitions 34 are secured in place as a permanent part of the fitting assembly 12 and form abutments for the ends of section 10 when the parts are moved together as will be more fully hereinafter set down.

Fitting 14 is in the nature of a conventional T; is formed of the same substance as that from which section 10 and fitting 12 are molded or otherwise produced, but has a conduit 38 centrally disposed therein to create a space 40 into which is packed insulating material 42 as shown in Fig. 1 of the drawing. Partitions 44 not only cooperate with the casing 46 of fitting 14, but operate with conduit 38 in creating the space 40. Thus, if conduit 38 were not present, the openings 48 through partitions 44 would create a hollow core within fitting 14.

Partitions 34 in fitting 12 and partitions 44 in fitting 14 are spaced inwardly from the mouth of openings in these respective fittings and when section 10 is moved to place as shown in Fig. 1, these partitions create abutments to limit the inward movement and to assist in holding the parts in assembled relation.

The ends of conduit 38 carried within fitting 14 and the ends of conduit 30 carried within fitting 12 extend beyond the confines of the casings 46 and 28 respectively thereof, to afford a convenient structure usable when bringing the component parts of the assembly together. In other words when the ends of conduits 38 and 30 are to be moved into telescoping relation with the ends of pipe 18 in section 10, such may be done with ease and dispatch for the ends of the conduits are visible and quickly insertable into the ends of pipe 18. As pipe 18 is telescoped over the ends of conduits 38 and 30 of fittings 14 and 12 respectively, the end portions of section 10 are moved into the opening formed in these fittings and to a point where the ends of casing 16 and the ends of pipe 18 abut the proximal partition in the fittings. Before this mechanical action of assembly takes place, it is desired that an adhesive of suitable character be spread upon the inter-engaging surfaces which when dried or set will establish a definite bond between the parts and prevent accidental displacement.

It will be observed from the foregoing and from Fig. 1 of the drawing that when the parts are placed in operative condition the conduits 30 and 38 and pipe 18 present a continuous passage through the pipe assembly which is completely insulated.

Figure 5:
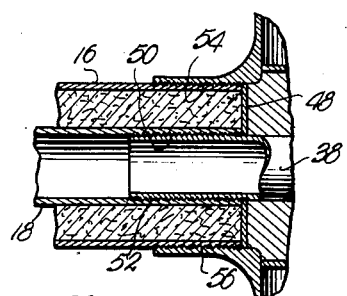
Fig. 5 is a fragmentary longitudinal sectional view through the zone of juncture between a section and a fitting constituting a part of the assembly and illustrating a modified manner of interconnecting the proximal or abutting component parts of the assembly.

Fig. 5 illustrates a slightly modified form of securing together the parts and this figure illustrates the zone of juncture between fitting 14 and casing 16 shown in Fig. 1. The pipe 18 of the form of the invention shown in Fig. 5 has internal screw threads 50 formed thereon to mate with external threads 52 formed on the outer surface of conduit 38 in fitting 14. Also, external threads 54 formed on casing 16 are in threaded engagement with internal threads 56 formed on fitting 14 and when the parts are secured together with the ends of casing 16 and pipe 18 abutting partition 44, a tight joint is formed.

Figure 4:
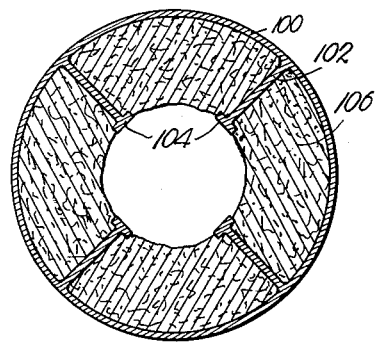
Fig. 4 is an enlarged, cross sectional view through a portion of the assembly, illustrating a modified form of the invention.

The modified form of the invention illustrated in Fig. 4 indicates the versatility of this invention and exemplifies the manner of producing a section 100 similar to section 10 as illustrated in Fig. 1. This section 100 is provided with a number of inwardly directed radial partitions 102 which terminate in heads 104 and frictionally engage a pipe when the assembly that is illustrated in this figure is slid thereon. Frictional interengagement between the intermost surfaces of heads 104 and the outer surface of the pipe upon which this assembly is placed is the same as illustrated in Fig. 3 and the ultimate results of preventing accidental displacement but yet allowing the assembly by placing insulating material 106 therein as assembly occurs is the same. The form of the invention illustrated in Fig. 4 may be employed where pipe already in use is to be insulated, but the insulation and outer pipe 100 (Fig. 4) must be combined with a straight section of pipe and no provision is made in this form of the invention to insulate the fittings that are already a part of an installation. Such fittings may be wrapped or otherwise insulated to cooperate with insulation 106 on the straight portions of an installation.

All of the parts of the assembly illustrated and above described are made of material having high insulating properties, both with respect to static electricity and heat exchanges and therefore the component parts of the assembly may be used where such qualifications are needed and without the necessity of separate wrappings and the like. It is also apparent that the temperature of any fluids or liquids passing through the intermost portions of the assembly will be maintained constant and heat losses will be reduced to a minimum. It is also apparent from the foregoing that the broad objects of the invention have been fulfilled and that a fluid conducting assembly of desirable characteristics has been produced.

It is obvious from the foregoing that modifications may be made in the specific embodiment of the invention without departing from the spirit thereof nor the scope of the appended claim.

Having thus described the invention what is claimed as new and desired to be secured by Letters Patent is:

A multi-part insulated fluid conducting assembly comprising a hollow fitting and an elongated section disposed in interconnected relationship, said section and fitting each including an inner, fluid-conducting conduit and an outer conduit surrounding, spaced from and substantially coextensive in length with the corresponding inner conduit, there being a plurality of spaced, transversely disposed, annular partition plates in said fitting interconnecting said inner and outer conduits thereof and presenting at least one chamber in the fitting, said section being provided with a plurality of longitudinally extending, substantially rectangular spacer partitions integral with a surface of one of the conduits thereof, extending toward and slidably engaging the proximal surface of the other conduit thereof whereby each of said conduits of the section may be shifted relative to the other thereof, said spacer partitions being disposed radially with respect to the axis of said inner conduit of the section to present a plurality of chambers within the section, one end of the inner conduit of the fitting being telescoped within the proximal end of the inner conduit of the section and one end of the outer conduit of the section being telescoped within the proximal end of the outer conduit of the fitting, said ends of the outer and inner conduits of the section abutting a proximal partition plate within the fitting, said fitting and section being constructed of extrudable, heat and acid resisting synthetic resin material; and a filling of insulating material within each of the chambers of the fitting and section respectively.

References Cited in the file of this patent

UNITED STATES PATENTS

| | | |
|---|---|---|
| 1,216,408 | Bridges | Feb. 20, 1917 |
| 2,410,308 | Scharwath | Oct. 29, 1946 |
| 2,423,213 | Weber | July 1, 1947 |
| 2,475,635 | Parsons | July 12, 1949 |
| 2,731,709 | Gaddis et al. | Jan. 24, 1956 |